May 11, 1954     J. A. SAFFIR     2,677,965
HEAT CONDUCTING SHEATH FOR CLINICAL THERMOMETERS
Filed Dec. 19, 1947
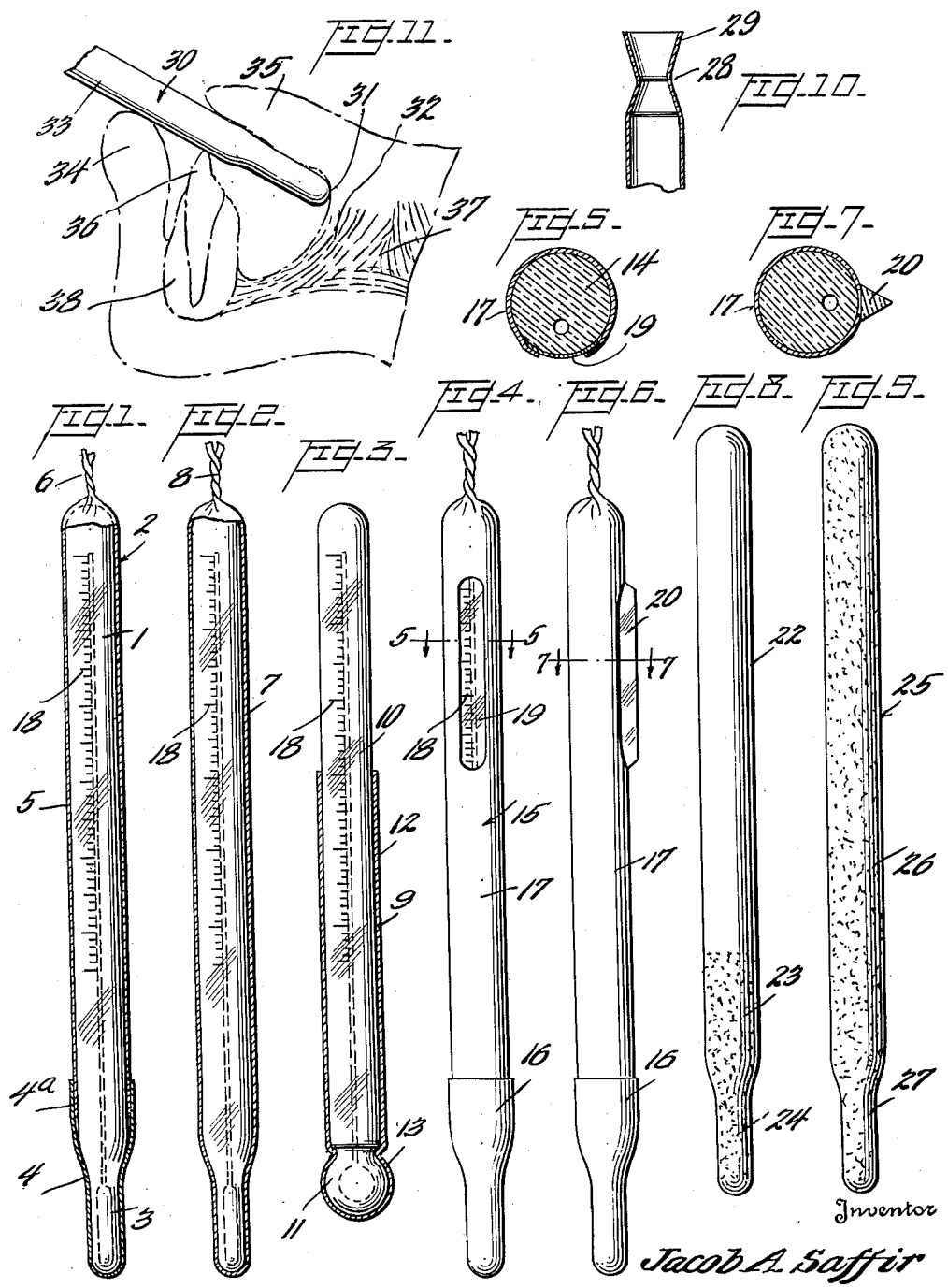
Inventor
Jacob A. Saffir
By Bennett H. Levenson.
Attorney

Patented May 11, 1954

2,677,965

UNITED STATES PATENT OFFICE 2,677,965

HEAT CONDUCTING SHEATH FOR CLINICAL THERMOMETERS

Jacob A. Saffir, Los Angeles, Calif.

Application December 19, 1947, Serial No. 792,635

19 Claims. (Cl. 73—372)

This invention relates to the precision thermometers, and in its preferred adaptation pertains to clinical thermometers involving novel features of structure and enhanced function.

The universal and invaluable usage attributable to the clinical thermometer is well known. Nevertheless the desirability of improvement therein has persisted and has in fact been accentuated by the wide, continuous adaptation of this device and the recurrence of the various problems attendant its use and construction.

Among the various characteristics of importance in the use of clinical thermometers, there are two significant requisites bearing upon the present invention, assuming as a premise that the device has been accurately calibrated and is capable of affording dependable temperature indications. These two comprise:

(1) The time element which must be sufficient to permit the indicating fluid, such as mercury, to attain its maximum element of expansion, corresponding to the temperature of the patient; and (2) Appropriate sterilization pursuant to the dictates of requisite sanitation and hygiene.

It has been ascertained that the conventional clinical thermometer requires approximately 5 minutes for the indicating fluid to attain its maximum expansion, and for average use a minimum of 3 to 3.5 minutes is considered ample for affording a reasonably accurate temperature indication. The importance of this time factor from the standpoint of the patient as well as those entrusted with his medical attention and care is beyond question.

For example, the time factor required for obtaining a reliable temperature indication with a clinical thermometer may have a material bearing on the breakage hazard attendant the use of the thermometer. This is especially noteworthy with a restive patient, whether it be a child or adult, and may likewise be significant with respect to the type of illness afflicting the patient, as illustrated in the case of convulsions. The seriousness of the thermometer breakage hazard through lacerations, imbedded glass chips, ingestion of the thermometer fluid, etc., is generally conceded, and the frequency of such breakage may be substantially curtailed by thermometers requiring a time interval materially below that of the prior art devices normally utilized.

The importance of the time element is further indicated with respect to the burden of duties with which any nurse may be laden during the course of administering to a number of patients in a hospital. Thus it is not infrequent that a patient is inconvenienced by the necessity of retaining the thermometer in position for an extent of time which distinctly reacts as a discomfort, which in some instances causes the patient to remove the thermometer from the position in which it was left by the nurse. In this latter connection, the withholding from the patient of knowledge of the temperature reading may be either desirable or essential, especially in view of a possible adverse psychological reaction.

Concerning the requisite sterilization, an ideal procedure involves washing and scrubbing the thermometer in running water, drying it and placing it for an ample time interval in a clean, effective antiseptic. Preferably a separate clinical thermometer should be available for each patient. The impracticability of this procedure is aptly illustrated by the course widely followed in taking temperatures in hospital wards, and which has been criticized as fraught with danger, as affording a false feeling of security, and as generally revulsive for diverse reasons which are further referred to hereinbelow. Usually the thermometer is immersed in the antiseptic solution (but not always available to the visiting physican or nurse) for a comparatively few seconds between its use with successive patients. Sterilizing solutions that are effective bactericides in the brief intervals of immersion present a distinct possibility of being harmful to the mucosa of the mouth. On the other hand, antiseptic solutions which are comparatively weak or manifest essentially no injury to the tissues in the mouth are of doubtful efficacy.

It will be understood that objections of the type indicated are likewise applicable in the practice of a physician as well as that of a visiting nurse. Suffice it to say that the need for improvement is quite manifest.

Attempts have been made to obviate the danger attendant the breakage of thermometers by providing a protective enveloping means of a metal or other material, but the concept of improving the functioning of the device has generally been utterly lacking. With respect to the problem of sterilization, some consideration has been given to the use of disposable covers for the thermometer. However these expedients have merely served to introduce collateral difficulties affecting the expedient operativeness of the device, as by substantially increasing the time required for attaining a reliable temperature reading.

In brief no means has been available involving the concept and combinative features of appropriately reinforcing the thermometer, enhancing its function as by curtailing the time required for attaining a reliable maximum temperature reading, and affording an optimum safeguard with respect to requisite cleanliness and sterilization.

It is an object of this invention to obviate such uncertainties and difficulties as hereinabove described.

Another object is a clinical thermometer manifesting improved functioning in its accelerated indication of reliable temperature, and providing maximum safeguards as to requisite cleanliness and sterilization.

Another object is to attain a temperature measuring device which affords both enhanced reinforcement thereof against the hazards of breakage and minimizes the objectionable features attendant improper conditions of sterilization.

A further and significant object of the invention comprises a clinical thermometer involving the coordinated features of reasonable reinforcement against undue breakage or shattering, optimum temperature measuring characteristics affording an expedited reliable temperature reading, and enhanced protection with respect to the requisites of cleanliness and sterilization.

An important object is the provision of a sheath adapted to enhance the temperature indicating function of the thermometer and to economically afford maximum protection relative to the requisite cleanliness and sterilization thereof.

An additional and significant object is a sheath adapted to reinforce a clinical thermometer against undue breakage or shattering, provide an improved temperature indicating function, and affording maximum safeguards as to requisite cleanliness and sterilization.

Other objects, advantages, and features of my invention will become apparent from the following description read in connection with the accompanying drawings, in which similar elements are designated by like numerals.

Fig. 1 shows in vertical section a clinical thermometer in combination with one desirable embodiment of sheath therefor.

Fig. 2 indicates another modification of sheath coordinated with a clinical thermometer, this showing being similarly in vertical section.

Fig. 3 presents an elevational view of a rectal type of thermometer, provided with a partial sheath shown in section.

Fig. 4 comprises a vertical elevation of a clinical thermometer enveloped by a sheath involving features of the invention, and including a transparent portion coordinated with the temperature measuring scale of the thermometer.

Fig. 5 is a cross sectional view taken along line 5—5 of Fig. 4.

Fig. 6 is similarly an elevational view of a thermometer fitted within a sheath manifesting characteristics of the invention, and having magnifying means integral therewith and coordinated with the thermometer scale.

Fig. 7 is a cross sectional indication taken along line 7—7 of Fig. 6.

Fig. 8 deals with an elevational indication of another modification of sheath enveloping the thermometer.

Fig. 9 conforms to an added embodiment of sheath-thermometer combination within the purview of the invention.

Fig. 10 presents in fragmentary elevation the opening portion of a sheath of the type indicated in Figs. 1, 2 and 4 to 6.

Fig. 11 diagrammatically indicates the usual positioning of the thermometer in the oral cavity of a recumbent patient.

Within the purview of my invention, a substantially improved thermometer combination is obtained by an appropriately fitted coordination of a thermometer with an expediently applied and removable enveloping cover means or sheath, manifesting requisite heat conducting properties. Fundamentally the combination is predicated upon an expedient element of heat conductivity of at least the portion of the sheath enveloping the bulb or reservoir section of the thermometer wherein the preponderant mass of expansible temperature indicating fluid is housed. In its preferred adaptation at least this reservoir enveloping portion of the sheath is in fitted contact and association with the corresponding surface area of the thermometer in order to eliminate substantially all air pockets which function as a heat insulator.

Additionally the length of the sheath relative to the thermometer should be at least such as to preclude any possible direct contact of the thermometer with the cavity of the patient, in which the temperature determination is made. In its preferred embodiments, the sheath completely envelops the entire thermometer.

Thus the invention affords an enlarged heat conducting area at least at that part of the thermometer surface which is of primary importance in expediting the expansion of the indicator fluid to reveal the prevailing temperature of the patient in a materially reduced time interval. At the same time the sheath retains the thermometer in a hygienic and sterile state during use with a given patient, without necessitating any resort to washing the thermometer or immersing the same in any antiseptic solution. Accordingly for subsequent use thereof in connection with another patient, it is merely necessary to remove the sheath for disposal, and replace the same by a new sheath—i. e., one which has not previously been utilized.

It will be seen that the concept of the invention includes a novel sheath which is appropriately heat conducting and expediently disposable, lending itself to substantial variation as to the materials which may be utilized both with respect to the portion of the sheath covering the well or reservoir of the thermometer as well as the portion thereof utilized for enveloping the remainder of the thermometer to maintain requisite hygienic and sterile conditions.

Referring more particularly to the features of the invention as indicated by the various figures of the drawing, which are intended as illustrative and not limiting, the thermometer 1 may be of any conventional type adapted for temperature measuring usage, although as shown it comprises a clinical thermometer. A sheath 2 completely embraces the thermometer, and desirably this sheath is closely fitted to the body of the thermometer in order to obviate any air spaces, at least relative to that portion of the sheath which envelops the bulb portion or reservoir 3. In the modification of Fig. 1, the sheath comprises two portions integral with each other, the lower portion 4 desirably being of a material of low specific heat and high heat conductivity, and the upper portion 5 comprising a comparatively non-conducting heat material.

Preferably portion 4 including bulb or reservoir portion 3 may be a metal foil of any non-toxic type, under the conditions of use, and desirably tasteless, while portion 5 of the sheath may be any material manifesting such characteristics of flexibility, resiliency and strength such as to lend itself to facilitated application and removal as a disposable device, which may be rendered available in appropriate sanitary or sterilized condition prior to usage. Said portion 5 may be non-conductive of heat, or it may be heat conducting similarly to portion 4. The portion 5 of the sheath in Fig. 1 is shown as paper, desirably a fluid impervious waxed paper of reasonable gauge or thickness, whereas sheath portion 4 may desirably be a foil of aluminum, tin, copper, silver or any other metal, which is not soluble or at least does not result in toxicity when in contact with saliva or in any other area of use. The choice is largely determined by the availability of the particular metal foil contemplated as well as the economic considerations involved.

As shown the heat conductive portion 4 of the sheath may be attached to the relatively heat non-conductive portion 5 in any expedient manner, such as through the application of adhesive at the relative end sections of the respective portions. The attachment in Fig. 1 is indicated at 4a, with the end of portion 4 being superimposed upon the corresponding end of sheath portion 5. The relationship of the relative ends may however be reversed with the end of portion 5 being affixed over the corresponding end of portion 4, although the arrangement as indicated in Fig. 1 is deemed preferable in view of the enlarged heat conductive surface available for contact with the patient. In any event, the completed sheath comprises in effect an integral container adapted to fit the thermometer.

The closure 6 of the sheath 2 may be attained merely by twisting the end of the sheath. Preferably the entire sheath is manipulated with the fingers to provide a snug fit to and surface contact with the thermometer for the purpose of avoiding heat non-conductive air pockets, especially relative to the thermometer surface embracing the reservoir or bulb. Subsequently to the aforesaid fitting of the sheath to the thermometer, the end or closure 6 may be formed as described. Thus the sheath may be easily applied to the thermometer and expediently removed therefrom.

The sheath modification of Fig. 2 contemplates the use of a metal foil throughout for the sheath 7, thereby covering both the reservoir or well as well as the upper body portion with a unitary heat conductive sheath. The closure end 8 is essentially similar to 6, being differentiated merely in the material utilized. Thus while closure 6 is waxed paper, closure 8 is of metal foil as previously stated.

In Fig. 3, the sheath 9 is indicated in combination with a rectal type of thermometer 10, and it is illustrative of an enveloping cover means which embraces only a portion of the thermometer. Thus the reservoir or well portion 11 is completely enclosed, and the sheath extends along a substantial portion of the thermometer body or stem to an extent which will preclude any contact by the patient with the thermometer surface, notwithstanding the partial nature of the sheath. The upper portion of the sheath 12 is shown as unitary with the lower portion 13 and in its entirety comprises heat conductive material. However as previously pointed out, upper portion 12 may be of relatively heat non-conductive material.

The sheath presented by Fig. 4 is of the composite type similar to that shown in Fig. 1, having a heat conductive material enveloping the reservoir or well portion of the thermometer affixed to a comparatively heat non-conductive upper portion. Thus the thermometer 14 is enveloped by a sheath 15, the lower portion thereof comprising metal foil 16 integrally affixed to a comparatively heat non-conducting material 17. Desirably portion 17 of the sheath may be of cellulosic derivation, such as a reasonably heavy waxed paper, although other materials manifesting the above described requisites of resiliency, flexibility and the like are applicable. Differing from the sheath contemplated by Fig. 1, which to all intents and purposes prevents a reading of the temperature scale of the thermometer as a result of the opacity of the paper portion of the sheath, the device contemplated by Fig. 4 is provided with a transparent area 19 attached to sheath portion 17 in any desired manner, as by resort to an appropriate adhesive substance. Illustrative of the material determining the transparent area or window 19 is Cellophane, but other transparent resins may likewise be effectively utilized. The said area or window 19 assumes a position on the sheath to conform with the calibrated temperature scale 18 of the thermometer, and thereby functions as an area of observation. Thus to facilitate the reading of the temperature with the sheath in situ, as where there is no objection to the patient's knowledge of the prevailing temperature, the sheath modification of Fig. 4 is quite convenient.

The features of sheath modification described in Figs. 4–5 may be retained even though the materials utilized are subject to variation. Thus portion 17 may be of a comparatively heat conductive material, similar to that of metal foil 16, with a window 19 appropriately positioned as shown. On the other hand, in lieu of an opaque material for portion 17 of the sheath, this portion may in its entirety be of Cellophane or other transparent material, thereby dispensing with the inclusion of any limited window or observation zone.

The sheath of Figs. 6 and 7 generally corresponds with that of Fig. 4, except that a magnifying means is utilized to serve as the window portion or observation area. The magnification may be attained in any expedient manner, as by a magnifying prism 20, which may comprise a transparent plastic material including glass or synthetic resin in appropriate form. Similarly to window 19 in Fig. 4, the magnifying means 20 is attached to portion 17 of the sheath of Fig. 6 in any convenient manner, with the proviso that it is positioned to conform with the indicator scale of the thermometer. As a matter of simple attachment, an appropriate adhesive material may be resorted to. Likewise the various alternatives concerning the choice of sheath material determining portions 16 and 17, as discussed hereinabove generally and with especial reference to the modification of Fig. 4, similarly apply to the sheath of Fig. 6.

In Fig. 8 the sheath 2 comprises a fundamentally heat non-conducting portion 22, desirably waxed paper, with the lower sheath portion 23 also being paper having embedded therein particles of metal, such as metal powder or metal granules, in sufficient proportion to afford expedient heat conductivity relative to the reservoir or well 24 of the thermometer. Except for the metal particles in portion 23, the paper of portions 22 and 23 may be similar or dissimilar.

The sheath 25 of Fig. 9 differs from that of Fig. 8 in that the particles or granules of metal or other heat conductive material are incorporated or embedded throughout the extent of the sheath. Thus no distinction pertains between the upper body portion 26 of the sheath and the reservoir or well portion 27. It will be apparent that the adaptation of observation areas, illustrated in Figs. 4–7 are similarly applicable to the illustrative sheath modifications described in Figs. 8 and 9.

The closure end of the sheath in Figs. 8 and 9 may be similar to that shown in Figs. 1, 2, 4, 6, and 10, or it may be merely fitted over the upper end as indicated in said Figs. 8 and 9. Thus, where in any of the sheath modifications the heat non-conductive material is of rubber or the like, the upper end of the sheath may merely adhere to the thermometer surface by virtue of the attendant elasticity.

The sheath contemplated by any of the various modifications shown in Figs. 1-9 may desirably be prefabricated as a casing or container adapted to reasonably conform to a given thermometer type and size. Indicative of a desirable sheath opening is the fragmentary vertical section of Fig. 10. Thus the upper portion of the sheath may be restricted as at 28 to render it adaptable to the rounded upper end of a clinical thermometer. In order to close the sheath it is merely necessary to twist end 29 as previously described, as shown at 6 or 8 in Figs. 1, 2, 4 and 6.

It will however be understood that the manner of producing the sheaths within the purview of the invention is not restricted to any particular procedure. In lieu of their prefabrication as casings or containers, a planar sheet or sheets of material having the desired characteristics may be resorted to, as by rolling the thermometer therein or by winding the sheet thereover in a manner to assure the complete coverage of at least the reservoir or well portion of the thermometer with a heat conductive sheet, where two different sheets or sheet types are utilized; or by a portion of the sheet where it is heat conductive throughout or is a composite of a heat conductive and relatively non-conductive section, as suggested in Figs. 1, 4, and 6-8.

Irrespective of the manner of fabricating the sheath, it is quite desirable that in its ultimate form when in position a fitted relationship is afforded relative to the thermometer. As previously indicated, the presence of air gaps, especially between the heat conducting portion of the sheath and the thermometer surface housing the reservoir or well, will retard the expansion of the indicating fluid in view of the heat insulation properties of air. Accordingly and as described in connection with Fig. 1 and similarly applicable to the various other modifications of the invention, the sheath should be fitted to the thermometer, as by manipulation with the fingers to obviate the presence of any air spaces or pockets between the inner surface of the sheath and the thermometer surface, particularly at the bulb or reservoir portion of the thermometer.

The enhanced efficiency of the thermometer pursuant to the present invention may be described by reference to Fig. 11. While this showing relates to a recumbent patient, it aptly indicates the usual position and contact of the clinical thermometer in the oral cavity, irrespective of the patient's posture. It will be seen that the thermometer 30 at its lower end 31 rests on the geniohyoglossus muscle 32 is essentially a point contact. While the upper portion 33 of the thermometer may be supported by lip 34 on one side and tongue 35 on the other surface, there can be little question that this is of comparative insignificance relative to the expansion of the indicator fluid. Similarly the thermometer supported by a tooth or teeth 36 is of essentially no consequence in attaining the requisite temperature indication.

Of primary significance in the attainment of a maximum expansion of indicator fluid is the point contact 31 and the extent to which saliva present swathes the bulb or reservoir. Under ordinary circumstances, comparatively little saliva is present upon the initial contact of the thermometer with the muscle or tissue material in the mouth and the formation of sufficient saliva to bathe the reservoir portion of the thermometer is a time factor. Moreover in the case of a recumbent patient, it is doubtful that an adequate amount of saliva is generated to bathe the thermometer bulb. Merely to complete the description of the showing in Fig. 11, the hyoglossus muscle is designated as 37 and the mandible 38 is likewise shown.

In view of these conditions which prevail during the retention of the thermometer in the mouth, it should be apparent that a substantial time element is essential in order to attain a reasonable maximum temperature indication. In this connection, it is additionally noteworthy that the calibration of thermometers is ordinarily performed by contacting a substantial portion of the lower surface, including the entire bulb or reservoir section thereof, with a heating fluid; this is significantly differentiated from the comparative point contact in the oral cavity as described hereinabove. Accordingly as previously stated, as much as 5 minutes may be necessary in order to permit a maximum expansion of the indicator fluid under conditions which pertain as shown in Fig. 11, where conventional clinical thermometers are utilized, and a minimum of 3 to 3.5 minutes is generally recognized as necessary for practical purposes in taking a temperature reading of a patient.

In contradistinction to this situation, the utilization of a thermometer provided with a heat conductive material appropriately fitted thereto, such as metal foil, will function to rapidly distribute the temperature manifested by the surface contact of the thermometer with the tissues in the mouth and any saliva which may be present. In effect, the provision of an enlarged heat conductive surface on the thermometer serves to obviate the circumstances attendant the conventional surface contact and the saliva insufficiency, as well as the time lag attributable to the comparative non-conductivity of the conventional thermometer casing such as glass, thereby materially enhancing the efficiency of the thermometer function. The resultant advantage and improvement attributable to the present invention in this respect is emphasized by the fact that an essentially complete expansion of the indicator fluid may be attained in a maximum of approximately 1½ minutes for the conventional clinical thermometer. Where the thermometer is of the so-called "2 minute type," and it is supplied with a sheath to afford a combination in accordance with the present invention, the time essential for a reliable temperature reading is reduced to approximately $\frac{9}{10}$ of a minute. It is to be understood that the definite time indications illustratively referred to are not intended to be restrictive herein, and as a matter of fact, it has been found in some cases that reliable temperature indications are obtainable pursuant to the present invention in as little as 15 seconds (one quarter of a minute).

The features of the invention bearing upon the necessity for retaining appropriate sanitary and sterile conditions are quite obvious. In lieu of the necessity for resorting to bactericidal solutions, with the attendant possibility of injury to the tissues in contact with the thermometer which has been immersed in such a solution, as well as the objections based upon the uncertainty as to the effectiveness of such solutions and the lack of hygienic conditions of cleanliness which may attain revulsive proportions, the sheath of the present invention entirely eliminates the necessity for use of such solutions. Thereby the sterilization problem is materially simplified. In view of the characteristics of the sheath, as well as the economic expediency involved, appropriately sterile and sanitary conditions may be retained by a single use of a given sheath, followed by discarding the same. Thus the thermometer per se is never brought into contact with the patient and accordingly cannot be the means for causing any cross infection. Likewise there is no possibility of any saliva adherence, where the sheath is of an appropriately moisture impervious material, such as metal foil or a reasonably heavy waxed paper. In addition the time consumed in appropriately sterilizing the thermometer is avoided, and the physician or nurse is called upon merely to the extent of replacing or discarding a given sheath.

Among the many features and attributes, the following are illustrative:

(a) An accelerated temperature rise is attainable due to the heat conductivity of the sheath, whereby the prevailing temperature of the patient is distributed to rapidly and completely envelop the reservoir or bulb of the indicating fluid of the thermometer.

(b) A more accurate temperature indication is afforded, since the enlarged area of surface contact provided by the heat-conductive sheathing of the thermometer, especially at the bulb or reservoir portion thereof, renders the use thereof to approach the conditions which prevail during the calibration of the thermometer.

(c) The significant discardable or disposable feature of the sheath obviates the necessity for reliance upon antiseptic solutions, resulting in elimination of the uncertainty of the sterilizing effects of the solution and any danger of cross infection which exists where a given bactericidal solution is utilized in order to render a thermometer sterile, where the thermometer is used for successive patients.

(d) In addition to the time saving advantages attributable to the adaptation of an enlarged heat conducting surface contiguous the thermometer bulb or reservoir, the work of the physician or nurse is materially simplified by eliminating the steps necessary for accomplishing reliably sterile conditions, where a given thermometer is successively used for a number of patients.

(e) The patient is relieved of the revulsive effect because of uncertain hygienic conditions and questionable cleanliness, as in the case of saliva adherence to the thermometer, where a given instrument is subject to use on a plurality of patients with intervening immersion in a sterilizing solution; or in view of the possibility that a given sterilizing solution may be used both for oral and rectal type of clinical thermometer. In addition the necessity for being subjected to undesirable malodorous effects or noxious tastes due to adherence of bactericidal solution to a given thermometer is obviated.

(f) The provision of a sheath pursuant to the present invention comprises a reinforcement of the thermometer and tends to minimize the hazards attendant the breakage or shattering of the instrument. This advantage applies to the conventional thermometer and especially to those where the fragile characteristics of the bulb portion are increased as a result of thinning the same to provide more effective temperature readings.

In brief it will be apparent that the various modifications and/or ramifications illustrative of the features of the invention may be subject to substantial change without deviating from the scope, concept or essence of the invention. For example, as described hereinabove, the material from which the sheath may be fabricated is subject to substantial diversification pursuant to the dictates of expediency, availability and economy. In addition to such heat conducting metal foils as aluminum, copper, silver or tin, the precious metals including platinum and gold may be utilized.

With further reference to the foils within the purview of the present invention, it will be understood that the expression "metal-containing," as utilized in the disclosure herein and in the appended claims, is intended to generically embrace the various illustrative types of heat conductive materials described, such as paper provided with metal particles in sufficient proportion to afford expedient heat conductivity, as well as the various foils of metal derivation, and includes within its scope any flexible or resilient disposable foil having sufficient metal therein or appropriately associated therewith to manifest efficient heat conductive properties and adapted to form a thermometer sheath pursuant to the invention herein.

In summary substantially any heat conductive foil or particles of heat conductive material appropriately associated with a foil may be used, provided that the conditions of non-toxicity are retained even in the zones of contact with the patient, as in the saliva of the mouth. Desirably the heat conductive material should be tasteless, although this detail does not affect the operativeness or advantages applicable to any essentially non-toxic heat conductive substance. While the use of precious, rare or expensive metal foils or particles may doubtless be restricted for reasons of availability and economic expediency, their economical adaptation may be attained by recourse to such procedures as the art of metal plating. In this manner commercially available metal or metal foil may be plated with a more expensive, rare or precious metal under conditions which are economically feasible.

As for the portion of the sheath which may be heat non-conductive, a similar diversity of materials may be resorted to. Illustrative of these, in addition to the waxed paper suggested hereinabove as a desirable embodiment, are the following: fluid impervious paper, Celluloid, Cellophane, natural rubber, synthetic rubber, plastics of any type including various synthetic resins such as the vinyl resins, acrylics, phenolic resins, alkyds, shellacs, etc.

While I have described my invention in accordance with desirable embodiments, it is obvious that many changes and modifications may be made in the details of construction and the combination and arrangement of the parts thereof, without departing from the spirit of the invention as defined in the following claims.

Having thus set forth my invention, I claim:

1. A temperature measuring device adapted to be positioned in a cavity of a living subject, comprising in combination a fluid impervious disposable flexible sheath and a thermometer having a temperature sensitive portion, said sheath completely enveloping at least the said temperature sensitive portion of the thermometer to preclude direct contact of the thermometer with the subject when the thermometer is positioned in said cavity for temperature measurement, at least the portion of said sheath enveloping the temperature sensitive portion of the thermometer comprising a metal-containing heat conducting material contiguous the surface of the thermometer to substantially preclude the presence of air pockets.

2. A temperature measuring device adapted to be positioned in a cavity of a living subject, comprising in combination a fluid impervious disposable flexible sheath and a thermometer having a stem integral with a bulb containing temperature-indicating expandable fluid, said sheath completely enveloping said bulb and at least a part of the stem sufficient to preclude direct contact of the thermometer with the subject, when the thermometer is positioned in said cavity of the subject for temperature measurement, at least the bulb-enveloping portion of said sheath comprising a metal containing heat-conducting foil contiguous the surface of the thermometer to substantially preclude the presence of air pockets.

3. A temperature measuring device as in claim 2, comprising a clinical thermometer, wherein the heat-conducting portion of the sheath is a metal-containing foil and completely envelops the bulb and the lower part of the thermometer stem, and the remainder of the sheath comprises a heat non-conductive material extending along a substantial portion of the stem and terminating below the end thereof.

4. A temperature measuring device as in claim 2 comprising a clinical thermometer, wherein the sheath is entirely of metal containing heat-conducting foil extending along a substantial portion of the stem and terminating below the end thereof.

5. A temperature measuring device comprising in combination a fluid impervious disposable flexible sheath and a clinical thermometer having a stem integral with a reservoir containing temperature-indicating expandable fluid, said sheath completely enveloping said thermometer, at least the reservoir-enveloping portion of said sheath comprising a metal containing heat-conducting foil contiguous the surface of the thermometer to substantially preclude the presence of air pockets between the sheath and the reservoir, and any portion of the sheath other than metal-containing foil comprising a comparatively heat non-conducting material.

6. A temperature measuring device as in claim 5 wherein the portion of said sheath enveloping the bulb and the lower part of the stem comprises said heat-conducting foil and the remainder of the sheath comprises said heat non-conducting foil, said sheath being contiguous the surface of the thermometer to substantially preclude the presence of air pockets.

7. A temperature measuring device as in claim 6 wherein the heat non-conducting portion of the sheath includes at least in part a transparent area at least sufficient to conform with the temperature-indicating scale of the thermometer.

8. A temperature measuring device as in claim 6 wherein the heat non-conducting portion of the sheath includes a transparent window conforming with the temperature-indicating scale of the thermometer, said window comprising a magnifying means.

9. A temperature measuring devices as in claim 5, wherein the entire sheath comprises a flexible metal containing heat-conducting foil, said sheath being contiguous the surface of the thermometer to substantially preclude the presence of air pockets.

10. A temperature measuring device as in claim 9, wherein the sheath is a metal foil.

11. A temperature measuring device as in claim 9, wherein the sheath comprises waxed paper having a proportion of metal particles embedded therein sufficient to provide heat conductivity.

12. A temperature measuring device as in claim 2, wherein the heat conducting foil comprises a metal foil.

13. A temperature measuring device as in claim 2, wherein the heat conducting foil is waxed paper having a substantial proportion of metal particles imbedded therein to provide heat conductivity.

14. A temperature measuring device as in claim 5, wherein the heat-conducting foil comprises a metal foil and the remainder of the sheath is a waxed paper.

15. A temperature measuring device as in claim 5, wherein the heat-conducting foil is a waxed paper having a substantial proportion of metal particles embedded therein to provide heat-conductivity and the remainder of the sheath comprises waxed paper free from heat-conducting metal particles.

16. A fluid impervious disposable flexible thermometer sheath adapted to envelop a fluid expandable reservoir type thermometer at least sufficiently to avoid contact of the thermometer with the subject of measurement, said sheath having an open end and a closed end, the closed end portion thereof comprising a metal-containing heat-conducting foil, said portion being at least sufficient to embrace the thermometer fluid reservoir, and the remainder of the sheath comprising a comparatively heat non-conducting foil.

17. A clinical thermometer sheath as in claim 16, wherein the heat conducting portion thereof comprises metal foil and the remainder thereof comprises waxed paper.

18. A clinical thermometer sheath as in claim 16 adapted to substantially envelop the thermometer, and comprising a waxed paper having a proportion of heat conducting particles embedded therein sufficient to render the same heat conducting.

19. A sheath as in claim 16, wherein the heat conducting portion of the foil comprises waxed paper having metal particles embedded therein sufficient to render the same heat conductive and wherein the heat non-conductive portion of the sheath comprises waxed paper free from heat conducting metal particles.

References Cited in the file of this patent

UNITED STATES PATENTS

| Number | Name | Date |
|---|---|---|
| 233,963 | Barry | Nov. 2, 1880 |
| 432,872 | Green | July 22, 1890 |
| 738,960 | Vaughan et al. | Sept. 15, 1903 |
| 748,752 | Koeneman | Jan. 5, 1904 |
| 801,681 | Nurnberg | Oct. 10, 1905 |
| 812,559 | Fruehauf | Feb. 13, 1906 |

FOREIGN PATENTS

| Number | Country | Date |
|---|---|---|
| 15,647 | Great Britain | Sept. 11, 1902 |